May 9, 1967  G. NIEMÖLLER  3,318,257
PASTURE PUMP FOR WATERING CATTLE
Filed Nov. 12, 1965  2 Sheets-Sheet 1
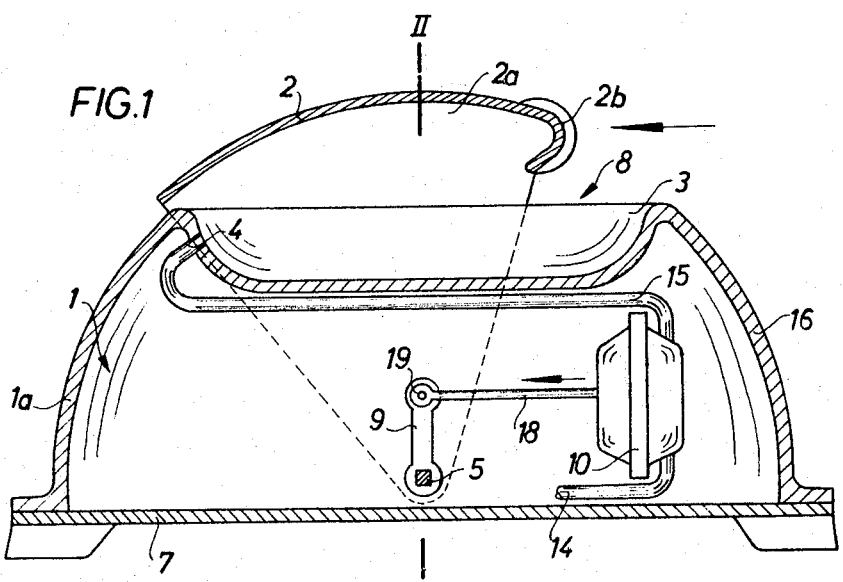
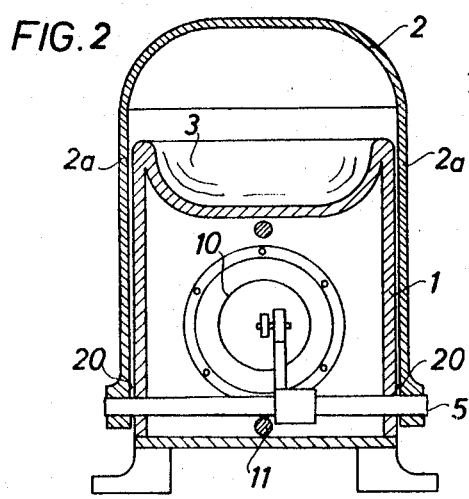
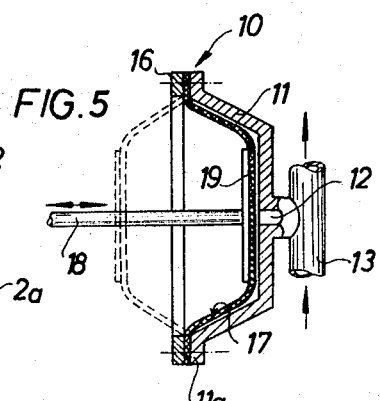
Gerhard Niemöller
INVENTOR.
BY Karl J. Ross
Attorney May 9, 1967  G. NIEMÖLLER  3,318,257

PASTURE PUMP FOR WATERING CATTLE

Filed Nov. 12, 1965  2 Sheets-Sheet 2

Gerhard Niemöller
INVENTOR.

BY  Karl F. Ross
Attorney

United States Patent Office 3,318,257
Patented May 9, 1967

3,318,257
PASTURE PUMP FOR WATERING CATTLE
Gerhard Niemöller, Ratekau, near Lubeck, Germany
Filed Nov. 12, 1965, Ser. No. 507,451
Claims priority, application Germany, Nov. 12, 1964,
N 25,810
8 Claims. (Cl. 103—208)

This invention relates to a pasture pump for watering cattle.

There are prior known pasture pumps having an elongated watering trough the access to which from above, from the sides, and from one end must be obstructed by a barrier in its state of rest allowing access for the cattle to said watering trough from one end only, so as to be forced, when they want to drink, to move the barrier in longitudinal direction to expose the watering trough for access. By the movement of the barrier a pump is actuated and water is discharged into the trough.

In all the prior art pasture pumps, having an elongated watering trough, a piston or diaphragm pump is actuated by a lever pivotally supported above the watering trough. This actuating lever may be provided with shields or may be constructed so that the lateral access is obstructed, and is pivotally supported either on an upwardly extending pump housing arranged at one end of the watering trough, or by means of upwardly extending links on a pump housing above the watering trough. It is obvious that the stability is unfavorably impaired by positioning the pivotal support of the actuating lever above the trough and the upwardly extending support of the pivotal support, and that any parts projecting upwardly above the watering trough impair the free movement of the animal's head in longitudinal direction and form parts which may be engaged by the animal's horns thereby causing damage, or the pump may be torn off its base and displaced by the animals.

It is also known to mount a transversely subdivided elongated watering trough on a pump rigidly anchored below the trough. A barrier rod obstructing the access to the upper side of the trough may be shifted by the cattle over a drinking ring from one side to the other. The pump is actuated by the barrier rod through a pivotally connected telescopic lever arm. The barrier rod always projects at least with one end beyond the one or the other end of the trough and is disposed relatively high above the ground, so that in this case also the above mentioned drawbacks are encountered, besides the fact, that the displacement of the pump element involves difficulties, since the animal must make a lateral movement with its head for actuating the pump.

One object of this invention is to provide a pasture pump having a minimum weight and a center of gravity lying well below the watering trough.

Another object of the invention is to provide a watering pasture pump which, except for the member obstructing the access to the watering trough, has no structures projecting above the watering trough.

Still another object of the invention is to provide a pasture pump in which the pump and its actuating means are completely concealed and protected.

A further object of the invention is to provide a pasture pump composed of very simple, economically manufacturable parts having a minimum of journal means.

The invention provides a pasture pump for watering cattle, comprising an elongated housing, an elongated watering trough forming the top portion of said housing, a pump protectedly arranged within said housing below said trough having its discharge connected to said trough, a shaft extending transversely through and rotatably supported by said housing, below said trough, drive means between said shaft and said pump, a thrust member secured to said shaft and straddling said trough, said thrust member including a barrier portion normaly obstructing the acces to said trough, said barrier portion being engageable by said cattle so as to pivot said thrust member downwardly, thereby exposing said trough, rotating said shaft, and actuating said pump for discharging water into said trough.

Obviously the pasture pump according to the invention shows, in comparison with the prior art, a substantially simplified construction in which the barrier portion of the thrust member forms the uppermost part, so that the animals practically find no point of action for upsetting or displacing the pump. The molded parts of the housing including the watering trough and also the thrust member are of extreme simplicity and may, besides this, have a pleasing appearance. An essential advantage is to be seen in the fact that the thrust member, when actuated, pivots along an arcuate path downwardly behind the rear end wall of the watering trough and the housing, and not upwardly as in case of the prior known structures. Thus the free movement of the animal's head in longitudinal direction of the trough is in no way impaired allowing to use practically the full length of the watering trough for the pumping stroke, whereby the length of the trough may be shortened correspondingly in comparison with the known constructions. An additional advantage is to be seen in the fact that practically merely the pump housing with the watering trough and the thrust member are required and that the housing conceals all of the movable parts including the pump in a well protected manner.

Other, and more particular advantages, and objects will be apparent from the following detailed description of one embodiment in connection with the attached drawings, given by way of example only.

In the drawings:

FIG. 1 is a vertical longitudinal section through the pasture pump according to the invention;

FIG. 2 is a cross section in the plane of line II—II of FIG. 1;

FIG. 5 is an axial section through a diaphragm pump mounted within the housing.

Figure 3:
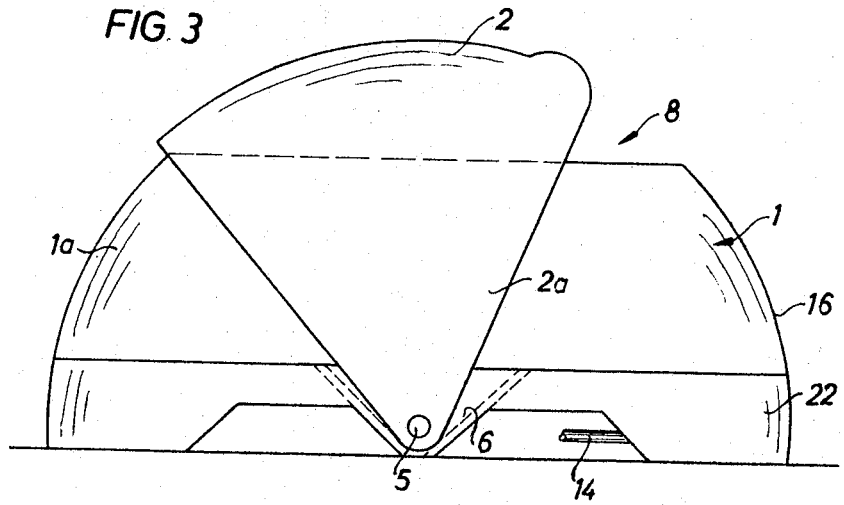
FIG. 3 is an elevational side view of the pasture pump with a somewhat modified housing.
Figure 4:
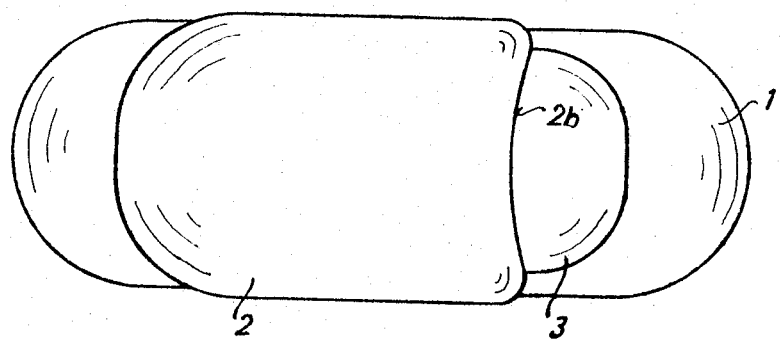
FIG. 4 is a top view of the pasture pump according to FIGS. 1 and 3.

The construction of the pasture pump according to the invention comprises substantially a housing 1 and a thrust member including a barrier portion. The top part of the housing is formed as an elongated watering trough 3, into which water is discharged by a pump through an inlet 4.

A pivot shaft 5 for said thrust member 2 is rotatably supported in the side walls of the housing below the watering trough. The ends of the pivot shaft 5 laterally project out of the housing. Lateral radially extending supporting arms 2a of the thrust member are secured to the ends of the pivot shaft 5. The thrust member 2 has a barrier portion in form of a plate including a forwardly disposed rounded edge 2b adapted to be engaged by the animal so as to pivot the thrust member about the shaft 5. Preferably the plate of the thrust member is arcuately curved with the center of curvature coinciding with the axis of the pivot shaft 5 leaving a free access to one end of the watering trough only, as indicated by the arrow. Suitably, for reasons of manufacture, the plate of the thrust member is also transversely curved and merges into the radially extending sector-like supporting arms 2a, whereby the plate 2 and the supporting arms practically form a hood completely covering the watering trough 3 except for the exposed end, whereby excessive contamination of the watering trough is prevented. The supporting arms 2a may as well have any other desired shape, and also the barrier portion may be, if so desired, constructed in any other suitable form, for example as a pipe, or grate-like construction.

The pump housing 1 may have any desired outer contour below the watering trough 3, merely requiring that the end wall 1a of the housing disposed in the pivotal direction of the thrust member 2 does not obstruct the arcuate movement of the thrust member. For this reason it is of advantage to also provide an arcuate shape for the end wall 1a of the housing 1 connected to the upper rear edge of the watering trough 3, and extending in the direction of thrust, the curvature radius of the end wall 1a being naturally smaller than the curvature radius of the barrier portion of the thrust member 2. The end wall 1a of the housing has also a curved cross section corresponding to hood shape of the thrust member. In order to provide a pleasing appearance the forward end wall 1b of the housing 1 may be shaped like the rear end wall 1a.

The pump housing may be open at its lower extremity, as shown in FIG. 3. In this case a V-shaped strut 6 extending transversely through the housing is disposed around the zone of the pivot axis 5 having its apex pointing downwardly, and serving to reenforce the housing 1 and protect the shaft 5. The V-shaped strut 6 may be mounted and secured to the housing after the pump members have been installed into the housing. However, it is also possible to close the bottom open housing 1 by means of a base plate 7, as shown in FIG. 1.

Within the interior of the pump housing 1 a radially extending arm 9 is secured to the transversely extending shaft 5. This arm 9 pivotally engages an actuating rod of a pump of any desired type. However, for spatial, and also for technical reasons it is of advantage to use a diaphragm pump 10 constructed in a known manner. A known per se diaphragm pump 10 which may be used advantageously is shown in FIG. 5. This pump comprises a one sidedly open, truncated conical housing 11 communicating via an opening 12 in its face wall and a manifold 13 with a suction duct 14 and a supply duct 15 connected to the inlet 4 of the watering trough, a check valve being provided in the suction duct 14 as well as in the supply duct 15. The housing 11 is open at one side and includes a marginal flange 11a to which a dish-shaped diaphragm 17 is secured by means of a ring 16. An actuating rod 18 provided with a plate 19 connected to the center portion of the diaphragm 17 engages the diaphragm 17. The actuating rod may also engage the diaphragm 17 by means of two plates clamping the center portion of the diaphragm therebetween. The other end of the actuating rod is pivotally connected to the radially extending arm 9 as shown at 19.

If a thrust is exerted against the rounded edge 2b of the thrust member 2 the shaft 5 is pivoted about its axis, and thus the actuating rod 18 and the diaphragm 17 are operated when the thrust member 2 is pivoted. This causes the pump 10 to suck water through the suction duct 14. The end position of the diaphragm 17 is shown in FIG. 5 in dotted lines. During the return movement of the thrust member 2 into its position of rest, shown in FIGS. 1 and 5, which may be achieved by any not illustrated spring means, or a counterweight, water is discharged through the supply duct and fed into the watering trough.

The above described diaphragm pump 10 is adapted to make long strokes at a minimum of internal resistance of the diaphragm, thereby requiring a minimum of thrust force exerted by the animal against the rounded edge 2b of the thrust member 2, and thus a large suction capacity is achieved. By using such a diaphragm pump and the one-sidely exposed diaphragm merely one pivot 19 is required between the actuating rod 18 and the radially extending arm 9 on the shaft 5.

In order to provide a safe connection between the thrust member 2 and the shaft 5 with its radially extending arm 9 the ends of the shaft are made non-circular, for example square or polygonal. At the bearing zones 20 in the housing 1 bearing sleeves made of plastic material are placed in this case on the shaft 5 rotating in corresponding bores of the side walls of the housing. It will be noted that the bearings 20 are spaced considerably corresponding to the width of the pump housing, whereby an extremely stable support for the thrust member 2 is achieved.

The pump housing 1 with its watering trough 3, and the thrust member 2 with its supporting arms 2a may each be formed integrally out of plastic material. However, it may be of advantage to cast the lower part 22 of the housing 1 out of metal, thereby improving the stability by lowering the center of gravity. The upper housing part 1 with its watering trough made of plastic material seats upon the lower part 22 and is secured in this position. This is shown by way of example in the embodiment illustrated in FIG. 3.

What I claim is:
1. A pasture pump for watering cattle, comprising an elongated housing, an elongated watering trough forming the top portion of said housing, a pump protectedly arranged within said housing below said trough having its discharge connected to said trough, a shaft extending transversely through and rotatably supported by said housing, below said trough, drive means between said shaft and said pump, a thrust member secured to said shaft and straddling said trough, said thrust member including a barrier portion normally obstructing the access to said trough, said barrier portion being engageable by said cattle so as to pivot said thrust member downwardly, thereby exposing said trough rotating said shaft and actuating said pump for discharging water into said trough.

2. A pasture pump for watering cattle, comprising an elongated housing, an elongated watering trough forming the top portion of said housing, a pump protectedly arranged within said housing below said trough having its discharge connected to said trough, a shaft extending transversely through and rotatably supported by said housing below said trough, drive means between said shaft and said pump, a thrust member secured to said shaft and straddling said trough, said thrust member including a barrier portion normally obstructing the access to said trough, a thrust member of substantially U-shaped cross section with segment-like legs secured on either outer side of said housing to said transversely extending shaft, the plate-like web of said thrust member forming a barrier portion normally obstructing the access to said trough but being engageable by said cattle so as to pivot said thrust member downwardly over the top edge of said trough disposed in the direction of thrust and merging into the downwardly directed end wall of said housing, thereby exposing said trough, rotating said shaft and actuating said pump for discharging water into said trough.

3. A pasture pump according to claim 2, wherein said barrier portion is arcuately curved in longitudinal direction the center of curvature coinciding with the axis of said transversely extending shaft, and wherein said downwardly directed end wall is arcuately curved about said shaft axis with a correspondingly smaller radius leaving a clearance between said end wall and said barrier member.

4. A pasture pump according to claim 3, wherein said barrier portion and said downwardly directed end wall are curved in transverse direction leaving a clearance between themselves.

5. A pasture pump according to claim 1, wherein said drive means between said shaft and said pump include a radially extending arm secured to said shaft within said housing, the free end of said arm being pivotally connected to a push rod secured to the exposed side of a diaphragm of a diaphragm pump.

6. A pasture pump according to claim 2, wherein at least said thrust member is made of plastic material.

7. A pasture pump according to claim 2, wherein the housing for said pump and said watering trough are integrally formed of plastic material.

8. A pasture pump according to claim 2, wherein the housing for said pump includes a base portion made of metal and an upper portion with said watering trough made of plastic material.

References Cited by the Examiner

UNITED STATES PATENTS 2,891,509   6/1959   Baschart _____ 119—75

FOREIGN PATENTS 1,312,041   11/1961   France.

ROBERT M. WALKER, *Primary Examiner.*